United States Patent [19]
Kimmelman

[11] 3,925,757
[45] Dec. 9, 1975

[54] TURN SIGNAL SYSTEM FOR POSITIVE INDICATION OF LAMP FAILURE

[75] Inventor: Samuel Kimmelman, Cranford, N.J.

[73] Assignee: Ideal Corporation, Brooklyn, N.Y.

[22] Filed: Nov. 23, 1973

[21] Appl. No.: 418,571

[52] U.S. Cl............... 340/66; 340/52 R; 340/81 R; 340/73; 340/80; 340/251
[51] Int. Cl.². ........................................... B60Q 1/00
[58] Field of Search ....... 340/66, 251, 74, 84, 81 R, 340/251 R, 73, 79, 80, 52 R; 317/29 B, 30, 31, 33 SC

[56] References Cited
UNITED STATES PATENTS

| | | | |
|---|---|---|---|
| 3,421,157 | 1/1969 | Atkins | 340/251 |
| 3,428,943 | 2/1969 | Carp et al. | 340/251 |
| 3,508,237 | 4/1970 | Kimmelman | 340/251 |
| 3,660,813 | 5/1972 | Rumpf | 340/241 |

Primary Examiner—John W. Caldwell
Assistant Examiner—Donnie L. Crosland

[57] ABSTRACT

A vehicle directional signaling system includes flashing right and left signal lamps and a pilot lamp which is flashed with the flashing of signal lamps and, by being kept on steadily when any signal lamp has failed, gives a positive indication of the signal lamp failure; the system including a flasher, a current sensitive relay having normally open contacts in a current path containing the pilot lamp and a silicon controlled rectifier in a second current path containing the pilot lamp, which is controlled by the relay so that current flow through the second path will continue in the event of failure of a signal lamp.

6 Claims, 4 Drawing Figures

LEGEND
F.C = FLASHER CONTACTS

TURN SIGNAL SYSTEM FOR POSITIVE INDICATION OF LAMP FAILURE

The present invention relates to directional turn signal systems for vehicles and, more particularly, to a circuit whereby the turn signal lamp(s) continue to flash when any of them fails to function yet the driver of the vehicle is given a positive indication that the lamp failure exists.

Motor vehicles steered by drivers generally have directional signal lamps which will flash, that is, go alternately on and off for short intervals, when activated to indicate that the vehicle is to be turned out of a straight path. Flashable lamps are provided at the right rear and left rear of the vehicle and often also at the right front and left front of the vehicle. Many vehicles, in addition, have corner lights located on the left and right front fenders, which may be activated when a turn is to be made.

The driver is made aware of the flashing of directional lights by a pilot lamp which generally is mounted within the vehicle on the dashboard or near the turn signal control handle. The flashing pilot lamp indicates that the turn signal system is operating. In some circumstances, the pilot lamp will also give a noticeable indication when any of the signal lamps is not functioning.

Presently used turn signal systems generally employ a flasher which is connected through the ignition switch to the battery of the vehicle. The flasher provides intermittent intervals of current flow, repeatedly turning the signal lamps on and off. If the flasher is of the fixed load type, i.e., is sensitive to a certain current flow and thus to the number of signal (load) lamps in the system, the failure of a signal lamp causes the pilot lamp and the functioning signal lamp(s) to remain steadily on, thereby indicating the lamp failure. If the flasher is of the variable load type, the functioning signal lamp(s) and the pilot lamp continue to flash upon the failure of a signal lamp, so that there is no indication to the driver that one or more of the signal lamps has failed. If the flasher is of the variable load type and it incorporates a normally open load-sensitive relay for pilot lamp operation, the failure of a signal lamp will cause the pilot lamp to remain steadily off as the remaining signal lamp(s) continue to flash, thereby requiring the driver to notice the absence of flashing of a pilot lamp in order to become aware of a signal lamp failure. The off condition of the pilot lamp is not a sufficiently noticeable indication.

The object of the present invention is to provide a flashing turn signal control system, or circuit, which gives the driver a positive indication of a signal lamp failure by holding a pilot lamp steadily on while continuing to flash the functioning signal lamp or lamps of the system.

The turn signal system according to the invention includes a flasher in a D.C. supply circuit leading to a plurality of signal lamps, a current sensitive relay having its coil in the load line from the flasher, and a gated thyristor, such as a silicon controlled rectifier, which forms part of a current supply path containing a pilot lamp and has its control gate connected to receive a control current from the signal lamp loadline. The pilot lamp is connectable not only in the current supply path containing the thyristor but also in a current supply path containing normally open contacts of the relay, and when the latter path is active the thyristor is bridged, or shorted out of circuit, so as to be rendered non-conductive.

Closing of the flasher contacts triggers the thyristor to active, or conducting, condition and thus lights the pilot lamp. The relay contacts then close and bridge-circuit the thyristor anode to cathode, causing it to become non-conductive but also providing another current path to keep the pilot lamp lighted. Under normal conditions, opening of the flasher contacts leaves the thyristor inactive and causes the relay contacts to open, so that the pilot lamp goes off. In the event of failure of a signal lamp, however, the current sensitive relay coil does not respond to the reduced current load then resulting from closing of the flasher contacts, and its contacts remain open. Accordingly, the thyristor, not being bridged in the pilot circuit, continues to conduct, and the pilot lamp is kept steadily lighted to give a positive indication of the lamp failure.

Another advantageous feature of some embodiments of the invention is that the pilot lamp will remain steadily lighted to indicate a load lamp failure until the ignition switch is turned off, even though the turn signal switch of the system has been returned to neutral position.

The foregoing and other objectives and features of the invention will be further apparent from the following detailed description and the accompanying drawings of illustrative embodiments of the invention. In the drawings.

Figure 1:
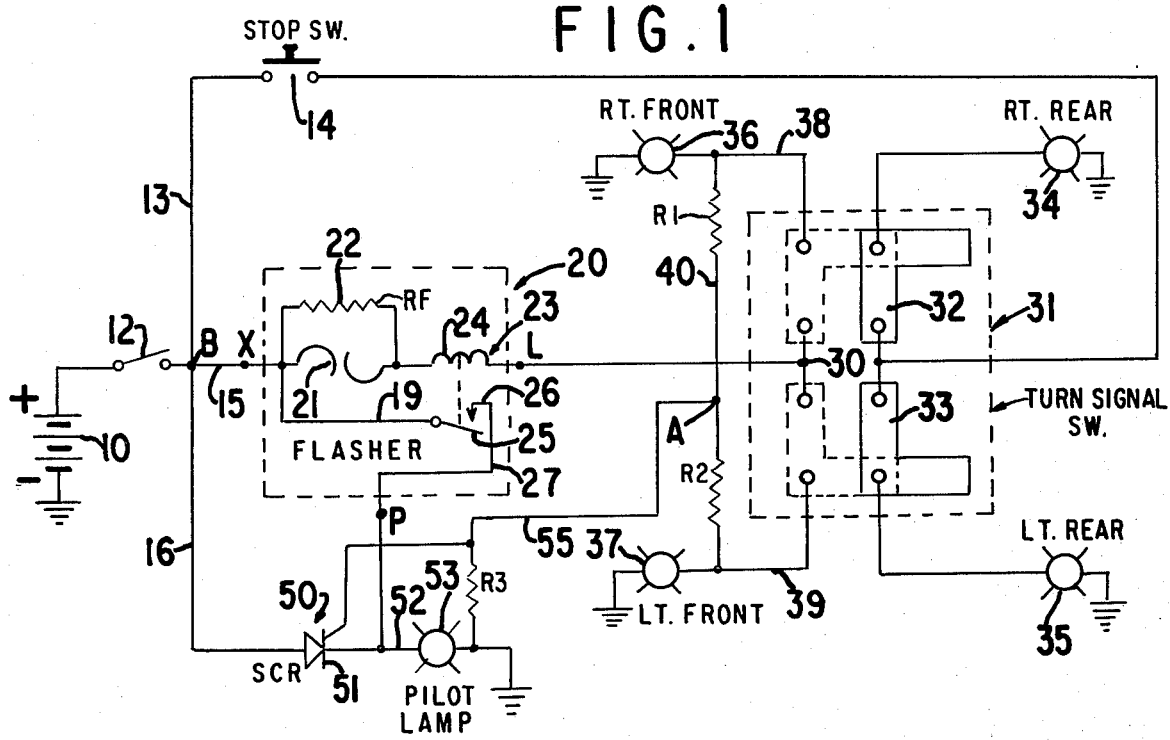
FIG. 1 is a schematic diagram of a turn signal circuit embodying the invention.

The turn signal system shown in FIG. 1 is adapted for use in a vehicle such as an automobile. The battery of the vehicle, which commonly is of 12 volts, is the power source of the system. The battery 10 has its negative terminal connected to ground and its positive terminal connected to the ignition switch 12. Upon closing of the ignition switch the battery is connected to terminal B of the turn signal circuit, having three current supply lines 13, 15 and 16 leading therefrom.

Line 15 is connected to the input terminal X of a variable load flasher 20 having two output terminals L and P. The flasher 20 includes flasher contacts 21, a resistor 22 bridging these contacts, and a current sensitive relay 23. The relay 23 has a normally open contactor 25 movable by coil 24 to close a circuit through fixed contact 26. The relay coil 24 is in the current output or load line leading to terminal L and is sensitive to the current flow through it. The movable contactor 25 is connected by lead 19 to the current supply line X. The fixed relay contact 26 is connected by lead 27 to terminal P and thence to a conductor 52 interconnecting a pilot lamp 53 and the cathode of a silicon controlled rectifier (SCR) 50.

A variable load flasher incorporating a load sensitive relay and suitable for use in the circuit is available commercially as the Model 568 flasher of Ideal Corporation, Brooklyn, New York. In the operation of that flasher or of other suitable flashers, which are well known, the closing of a circuit containing the flasher causes current to flow through the resistor 22 with ensuing heating and expansion of the resistor, as a result of which the flasher contacts 21 are closed. When they close, the resistor 22 is bypassed by the current flow; so it cools off and then causes the flasher to snap its contacts 21 back to open condition for repetition of the flashing cycle. Thus, there is an intermittent, repetitive closing and opening of the circuit containing the flasher.

The flasher output terminal L is connected to the input terminal 30 of the turn signal switch 31. This switch is of conventional construction and usually is operated manually by a handle on the steering shaft enclosure of the vehicle. The turn signal switch illustrated in FIG. 1 comprises shiftable, L-shaped conductive plates 32 and 33 for controlling the right signal lamps and the left signal lamps, respectively. Either of these plates is movable by the switch handle (not shown) from a normal position shown in full lines [in which the rear signal lamps 34 and 35 of the vehicle will be lighted upon the closing of a stop switch 14 in line 13 to a flashing position shown in broken lines. In flashing position, the L-shaped plate 32 conducts the flasher output current into leads to the right front and right rear signal lamps 36 and 34. Plate 33 in flashing position conducts that current into leads to the left front and left rear signal lamps 37 and 35.

The leads 38 and 39 from switch 31 to the right and left front signal lamps are interconnected by a branch line 40 having a leg 55 connected to it at point A. Between each of those leads and point A, line 40 contains a resistor R1 or R2 which allows only a limited flow of current into the leg 55 when the front signal lamp on either side of the vehicles is flashing. Each of the resistors R1 and R2 may have, for example, a resistance of about 1000 ohms. The leg 55 of line 40 from point A is connected to the gate of the rectifier and is also connected to ground through a resistor R3 having, for example, a resistance of about 150 ohms. Thus, a controlled current can be carried by leg 55 to the SCR gate, at a voltage sufficient to trigger the rectifier to its conductive, or "on", condition.

The battery current supply line 16 is connected to the anode of the silicon controlled rectifier (SCR) 50. The SCR cathode is connected by lead 52 to the pilot lamp 53, and through that lamp to ground.

As is well known, a silicon controlled rectifier (SCR) is an electronic n-p-n-p semiconductor having three electrodes: the anode, the cathode, and a gate, which is its control electrode. It conducts primarily in one direction,, the "forward" direction, but will not commence forward conduction until the gate is activated, which triggers the device. Activation of the gate causes the forward breakover voltage, the minimum value required for forward conduction, to be exceeded. Once commenced, forward conduction will continue, even without a triggering voltage on the gate, until the current to the cathode drops below the "holding current", i.e., is less than the breakover conduction, of the SCR. A reverse bias will turn off the device. The SCR is a reverse blocking triode type of thyristor.

In the normal operation of the turn signal system illustrated in FIG. 1, with the ignition switch 12 closed and with all the signal lamps and the pilot lamps operable, the circuit functions as follows: The driver, to indicate, for example, that he is about to make a turn to the right, manually moves a handle shifting the switch plate 32 to its flashing (broken line) position. A small voltage transmitted by resistor 22 then appears at point A and the gate of SCR 50; this voltage is insufficient to trigger the SCR. The contacts 21 of variable load flasher 20 soon close to effect the first flash of lamps 34 and 36, at which time the voltage at point A and to the SCR gate increases to a level sufficient to trigger the SCR, thereby causing current to flow from line 16 through SCR 50 to the pilot lamp 53, and lighting that lamp. The load of the signal lamps causes a flow of current through the relay coil 24 sufficient to close the relay contacts 25 and 26 a very short time after the SCR has been triggered. The closing of those contacts brings the battery current through them and lines 27 and 52 to the pilot lamp 53, thus keeping that lamp lighted while the load lamps are lit. In addition, it brings the battery current to the cathode of the SCR, thus shorting the SCR out of circuit anode to cathode and causing the SCR to cease conducting.

Every time the signal lamps flash, the pilot lamp 53 also flashes until the circuit to it is opened by the reopening of the relay contacts 25,26 as a result of the opening of flasher contacts 21 to extinguish the turn signal lamps. Each opening of the flasher contacts 21 reduces the voltage level at point A and at the SCR gate to below the gate trigger voltage, so that opening of the relay contacts with attendant removal of current from the SCR cathode, which occurs a finite interval after the flasher contacts have opened, does not result in current flow through the SCR from line 16 to the pilot lamp. If, however, any of the signal lamps has failed in the load circuit closed by the turn signal switch, the current load of the flashing system is reduced so that the flow of current through the relay coil 24 upon each closing of the flasher contacts 21 is then too little to cause closing of the relay contacts. In this condition, the SCR 50 is triggered to its on, or conductive, condition as in the normal operation described above; but, since there is no ensuring current flow to the SCR cathode through the relay contacts and line 27, the SCR continues to conduct current from line 16 to the lead 52 of the pilot lamp. The conductive condition continues even after the flasher contacts have opened, and even though the turn signal switch is opened.

The pilot lamp 53 is thus kept lighted in a steadily on condition, giving a positive indication to the driver of the vehicle that one or more of the turn signal lamps is not functioning.

Figure 2:
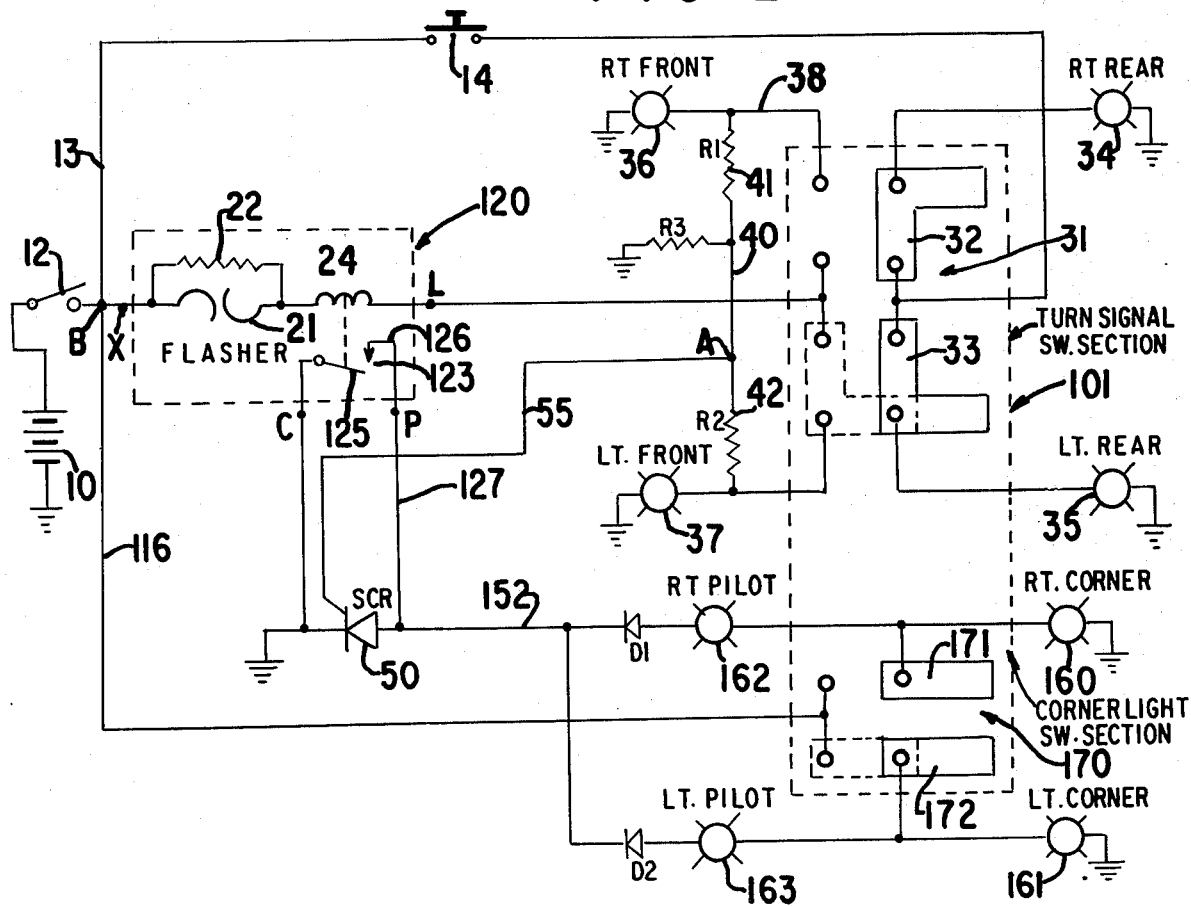
FIG. 2 is a schematic diagram of a second embodiment of the invention.

The embodiment of the invention illustrated in FIG. 2 is similar in many respects to that of FIG. 1. Elements of it corresponding to elements of FIG. 1 are designated by corresponding reference numerals. In this embodiment, however, the variable load cycle flasher 120 incorporates a load sensitive relay 123 having normally open contacts 125 and 126 in a circuit containing a pilot lamp which is isolated from the flasher input terminal.

The movable relay contact 125 is connected from terminal C to the cathode of a silicon controlled rectifier (SCR) 50 and to ground, while the fixed relay contact 126 is connected from terminal P through line 127 to the SCR anode and through line 152 to a pilot lamp system. The gate electrode of SCR 50 is connected as before by leg 55 to point A of branch line 40. The control of the gate activating voltage in line 55 is effected by resistors R1, R2 and R3 as before, but in this case resistor R3 is connected between line 40 and the ground.

The turn signal system of FIG. 2 includes, in addition to the basic elements of FIG. 1: a right corner lamp 160 and a left corner lamp 161; a corner light switch section 170 having switch plates 171 and 172 coupled with the turn signal switch plates 32 and 33, respectively, in a combined switch unit 101; and two pilot lamps 162 and 163 instead of just one — pilot lamp 162 being for the right turn lamps, and pilot lamp 163 for the left turn lamps. Diodes D1 and D2 are connected respectively between the pilot lamps 162, 163 and line 152 connected to line 127 and the cathode of SCR 50. The right and left corner switch plates of section 170 are moved respectively with the right and left turn signal switch plates of section 31; when so moved away from the normal position shown, they close circuit connections to the right and left corner lamps 160 and 161, respectively.

The embodiment of FIG. 2 operates in essentially the same manner as that of FIG. 1 so far as concerns the flashing cycles and the triggering and the bridging or nonbridging of the SCR anode to cathode through the normally open relay contacts. It will be evident, of course, that the flow of battery current to the SCR in this embodiment is obtained from line 116 through the corner switch section, a pilot lamp, a diode D1 or D2, and line 152; also, that the same current is conducted to both the anode and the cathode of SCR 50, and to ground, when the contacts of relay 123 are closed.

The ignition switch being closed, the flasher circuit is activated to flash all the right side, or all the left side, signal lamps and light the corresponding corner lamp upon movement of the corresponding turn signal switch plates to flashing postion. The corresponding right or left pilot lamp is lighted at the same time. The diodes D1 and D2 prevent interaction between the two pilot lamps. The corner lamp 160 or 161 remains lighted steadily but the signal lamps flash while the turn signal switch is on.

If any of the front or rear signal lamps has failed, then the decreased load which results causes the relay to let the normally open relay contacts 123 remain open; so the SCR continues to conduct and the pilot lamp stays lit even when the flasher contacts 21 are opened. In this embodiment, however, when the turn signal switch is returned to its normal position, plates 171 and 172 then shifting to their full line position seen in FIG. 2, the pilot lamp is extinguished.

In the circuit of FIG. 2, like that of FIG. 1, the rear turn signal lamps 34, 35 function as stop lights, if not connected in the flasher circuit, by being lighted by current conducted through line 13 when the stop switch 14 is closed.

Figure 3:
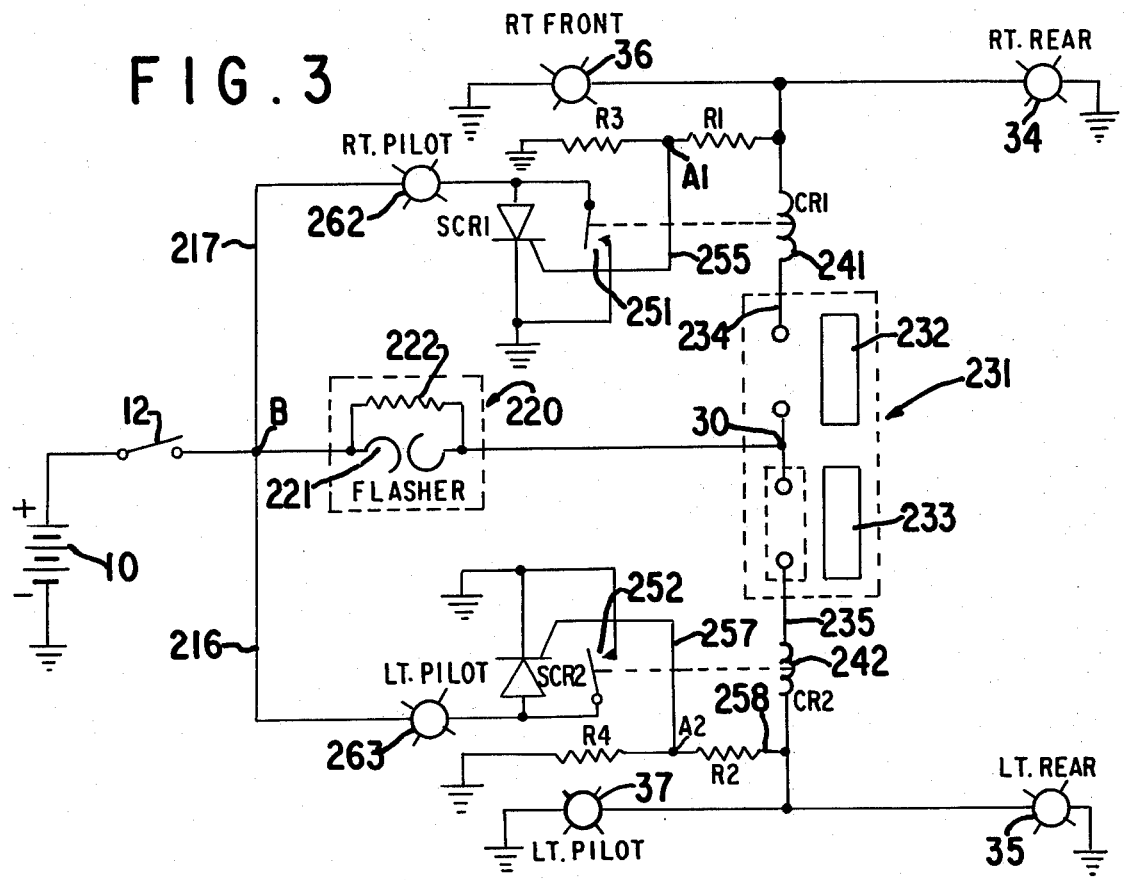
FIG. 3 is a schematic diagram of a third embodiment.

FIG. 3 shows a circuit according the invention in which the rear turn signal lamps do not act also as stop lights. In this system, the flasher 220 comprises only the flasher contacts 221 and the bridging resistor 222. The turn signal switch 231 has only one output lead 234 or 235 for each set of front and rear signal lamps. Accordingly, two normally open load sensitive relays CR1 and CR2 are provided with their respective coils 241 and 242 in the current supply lines 234 and 235 of the respective sets of signal lamps, and a pilot lamp 262 or 263 controlled by a silicon controlled rectifier SCR1 or SCR2 is provided for each set of the signal lamps.

Current supply lines 216 and 217 lead the current from the ignition switch 12 to the pilot lamps 262 and 263 respectively. A pilot lamp lights when the rectifier SCR1 or SCR2 connected to it is in a conductive state so as to pass the battery current through it to ground. The rectifier is triggered to conductive state by a controlled voltage applied to its gate through line 255 or line 257. Each of these lines runs from a point A1 or A2 between two resistors R1 and R3, or R2 and R4, in a branch line 256 or 258 leading from load line 234 or 235 to ground. The voltage level at point A1 or A2 when the respective side of the sytem is operating corresponds to that at point A in FIG. 1.

When the coil of relay CR1 or CR2 has closed the corresponding relay contacts 251 or 252, the rectifier SCR1 or SCR2 is bridged anode to cathode so as to cease conducting; but the closed relay contacts then keep the related pilot lamp lighted until the flasher contacts open. Then the pilot lamp goes off.

On the other hand, if a signal lamp has failed, the relay contacts are not closed and the rectifier continues in its conductive state, with steady lighting of the related pilot lamp, for as long as the ignition switch 12 stays closed. As in the embodiment of FIG. 1, this positive indication of lamp failure continues even though the turn signal switch is opened.

Figure 4:
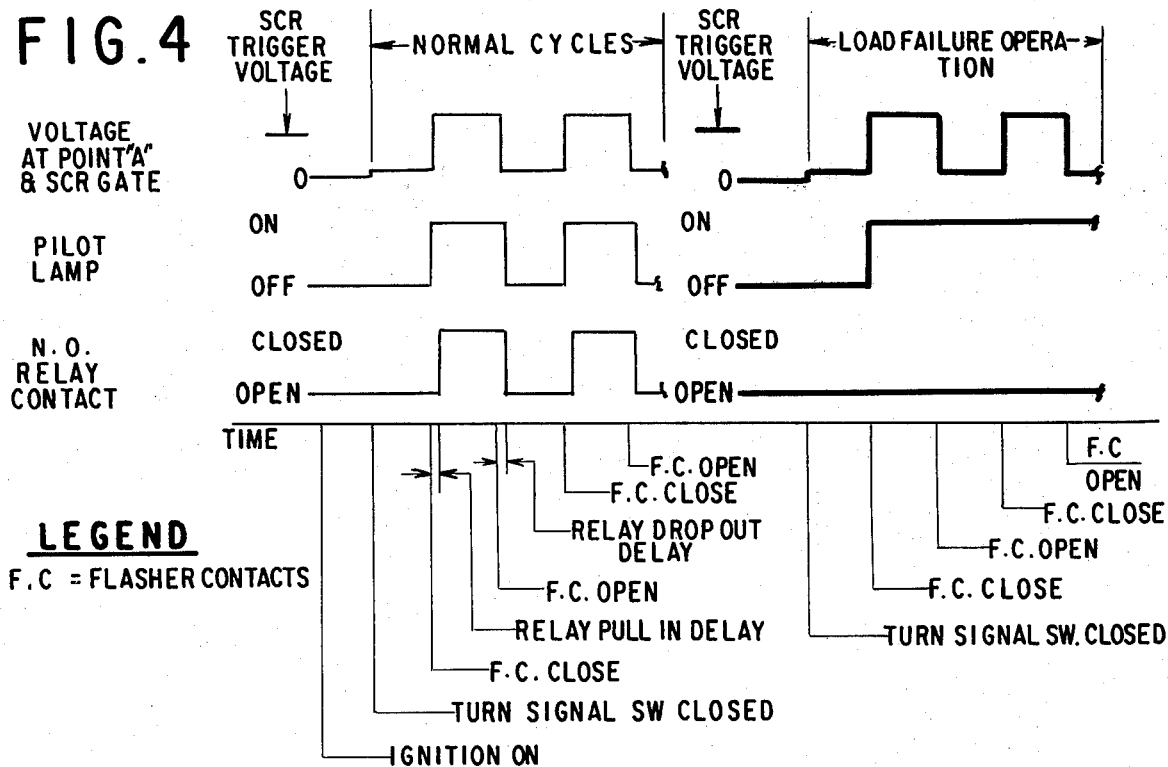
FIG. 4 is a chart illustrating cyclical operations of elements of the circuit of FIG. 1 in their normal cycles and in their operation when a signal lamp has failed.

The chart of FIG. 4 enables a further understanding of typical cylical operations which exist in an embodiment of the invention according to FIG. 1. It will be noted that in the normal operation, when all the turn signal lamps are operative, the relay contacts close and open, in each instance with a slight delay, just after closing and opening respectively of the flasher contacts. The voltage at point A (and at the SCR gate) is above the SRC trigger voltage while the flasher contacts are closed, but is below the trigger voltage afterward in the delay interval that precedes opening of the relay contacts. The pilot lamp stays lighted in that interval, going off when the relay contacts open. Upon failure of a turn signal lamp the SCR gate voltage continues to rise and fall with the closing and opening of the flasher contacts, but since the relay contacts do not close the pilot light remains steadily lit.

What is claimed is:

1. In a turn signal circuit for a vehicle having a D.C. current source, a plurality of signal lamps and a turn signal switch therefor, a flasher load circuit comprising, for connection in series between said source and said turn signal switch, a variable load flasher the contacts of which are closed and opened repetitively in response to current in the load circuit, a load-sensitive relay having normally open contacts, and a first current path including a pilot lamp closable by said relay contacts, the combination which further includes a second current path containing a silicon controlled rectifier (SCR) in series with said pilot lamp for lighting said pilot lamp and means for applying a triggering voltage to the gate of said SCR and thereby rendering said SCR conductive to activate said second path when said load circuit is activated, said SCR being bridged anode to cathode by a part of said first path, and thereby being rendered non-conductive, when said relay contacts are closed, said relay being operative to dose said relay contacts in response to normal flow of load current to said signal lamps but being inoperative to close them if the load current is below a predetermined level, whereby when a signal lamp has failed said SCR will be kept conductive and said second path active to keep said pilot lamp lighted steadily while the signal lamp or lamps remaining operative continue being flashed.

2. A circuit according to claim 1, said SCR having its anode connected to a current supply lead from said source and having a lead from its cathode connected to said pilot lamp and through it to ground, said relay contacts being in a line for interconnecting said supply lead and said cathode lead.

3. A circuit according to claim 1, said pilot lamp being connected to a current supply lead from said source and having a ground lead, a first part of which is connected to the anode of said SCR and a second part of which is connected from the cathode of said SCR to ground, said relay contacts being in a line for interconnecting said first part and said second part of said ground lead.

4. A circuit according to claim 1, said vehicle further having a corner lamp and a corner lamp switch closable with said turn signal switch to light said corner lamp when said load circuit is activated, said corner lamp switch being normally open and being connected to a current supply lead from said source, said pilot lamp being connected to a lead from said corner lamp switch to said corner lamp and having a ground lead a first part of which is connected to the anode of said SCR and a second part of which is connected from the cathode of said SCR to ground, said relay contacts being in a line for interconnecting said first part and said second part of said ground lead.

5. A circuit according to claim 1, said voltage applying means comprising a branch line connecting said gate with a lead of said load circuit between said turn signal switch and at least some of said signal lamps, said branch line having a first resistor therein and having a ground connection containing a second resistor, whereby current from said load circuit is applied to said gate at a controlled voltage sufficient to render said SCR conductive.

6. A circuit according to claim 5, said first resistor having a resistance of the order of 1000 ohms and said second resistor having a resistance of the order of 150 ohms.

* * * * *